United States Patent
Crowley et al.

(10) Patent No.: US 10,872,039 B2
(45) Date of Patent: Dec. 22, 2020

(54) MANAGING REDUNDANCY CONTEXTS IN STORAGE DEVICES USING EVICTION AND RESTORATION

(71) Applicant: Micron Technology, Inc., Boise, ID (US)

(72) Inventors: James P. Crowley, Longmont, CO (US); Yuriy Pavlenko, Lake Forest, CA (US); Karl D. Schuh, Santa Cruz, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 116 days.

(21) Appl. No.: 16/208,499

(22) Filed: Dec. 3, 2018

(65) Prior Publication Data
US 2020/0174935 A1 Jun. 4, 2020

(51) Int. Cl.
| G06F 12/00 | (2006.01) |
| G06F 12/0871 | (2016.01) |
| G06F 12/0891 | (2016.01) |
| G06F 11/07 | (2006.01) |
| G06F 9/50 | (2006.01) |
| G06F 11/20 | (2006.01) |

(52) U.S. Cl.
CPC ........ *G06F 12/0871* (2013.01); *G06F 9/5016* (2013.01); *G06F 11/073* (2013.01); *G06F 11/2089* (2013.01); *G06F 12/0891* (2013.01); *G06F 2212/312* (2013.01)

(58) Field of Classification Search
None
See application file for complete search history.

(56) References Cited

U.S. PATENT DOCUMENTS

| 6,021,463 | A | 2/2000 | Belser |
| 8,042,023 | B2 | 10/2011 | Balb |
| 8,244,938 | B2 | 8/2012 | Aronovich et al. |
| 8,677,203 | B1 | 3/2014 | Shalvi et al. |
| 2013/0151764 | A1* | 6/2013 | Strope ................ G06F 12/0246 711/103 |
| 2017/0147435 | A1 | 5/2017 | Werner et al. |

OTHER PUBLICATIONS

International Search Report and Written Opinion, PCT App. No. PCT/US2019/061005, dated Apr. 9, 2020, 11 pages.

* cited by examiner

*Primary Examiner* — Midys Rojas
(74) *Attorney, Agent, or Firm* — Nicholson De Vos; Webster & Elliott LLP

(57) ABSTRACT

A controller selects a redundancy context for eviction in response to a request for a redundancy context. The redundancy context includes buffer data and an identifier. The redundancy context is evicted by instructing a redundancy component to send the buffer data and identifier to a memory component to store in a buffer as an evicted context. The controller instructs the memory component to provide the evicted context for storage in a controller buffer. A new redundancy context is allocated to the requester following the eviction.

20 Claims, 6 Drawing Sheets

MANAGING REDUNDANCY CONTEXTS IN STORAGE DEVICES USING EVICTION AND RESTORATION

TECHNICAL FIELD

The present disclosure generally relates to managing redundancy contexts, and more specifically, relates to evicting and restoring redundancy contexts.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data in the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
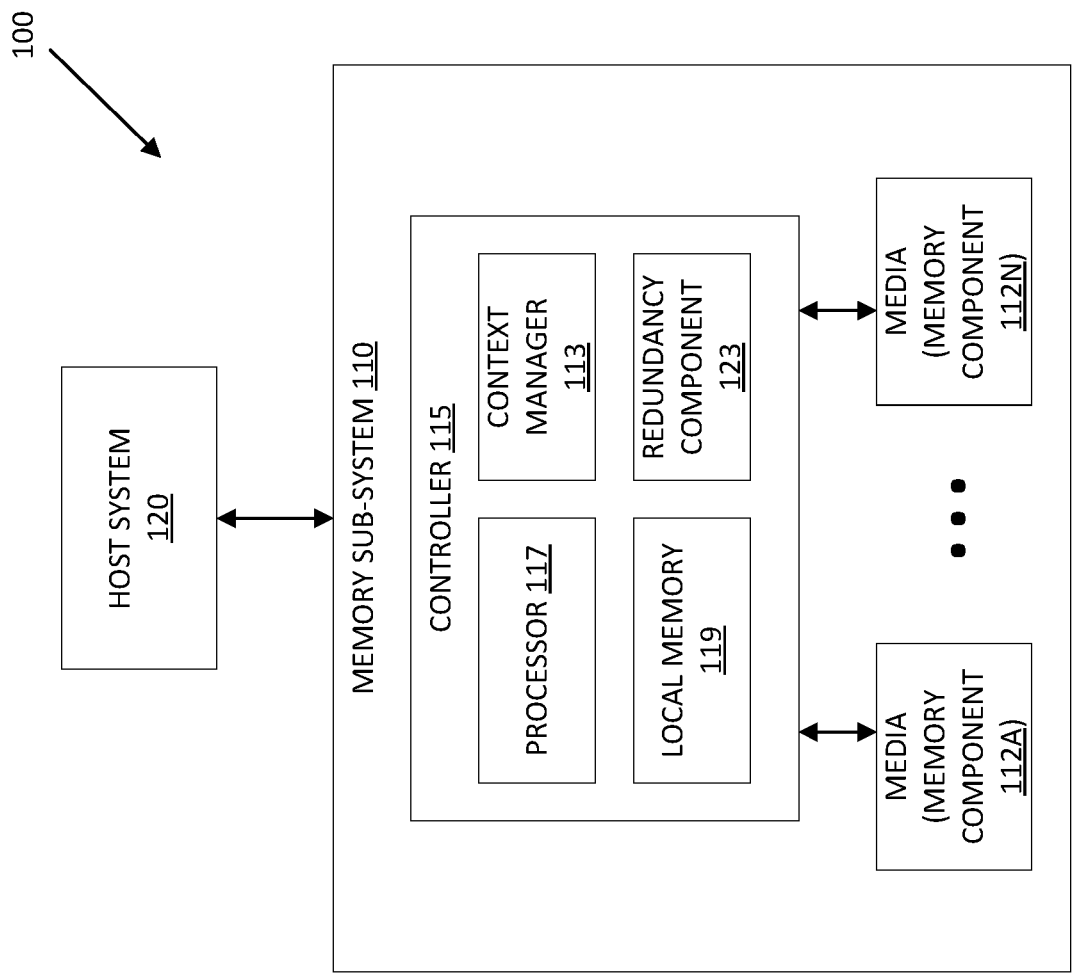
FIG. 1 illustrates an example computing environment that includes a memory subsystem in accordance with some embodiments of the present disclosure.

Aspects of the present disclosure are directed to managing redundancy contexts in a memory subsystem. A redundancy context is a portion of memory dedicated for temporarily storing data for calculating redundancy values, such as parity data calculated for fault tolerance. For example, a redundancy value can be the result of an XOR operation performed on sets of data written to non-volatile memory. If an error is detected in one of the sets of data, the other set of data and the result of the XOR operation can be used to recover the data.

A memory subsystem is also hereinafter referred to as a "memory device." An example of a memory subsystem is a storage system, such as a solid-state drive (SSD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Conventional storage systems use redundancy components when storing data to improve the ability of the storage system to recover from data loss. A redundancy component calculates redundancy values for sets of data. The redundancy component includes a limited amount of memory used to temporarily store the portions of data while a redundancy value is calculated by the redundancy component. This limited memory is divided into redundancy contexts, which provide the working space for the redundancy component to accumulate data to be written and calculate the redundancy value.

In one embodiment, a redundancy context includes metadata stored in a table entry. The metadata includes a context identifier used to identify a specific redundancy context and a pointer to a working buffer used to calculate the redundancy value. The table entry can be stored in a redundancy context buffer in the redundancy component. After the redundancy value is calculated, the data to be written and the associated redundancy value are transmitted to the memory components for storage. The redundancy component can be a separate piece or component of hardware incorporated into the storage system with a limited number of redundancy contexts made available to the storage system to enable generation of redundancy data when writing to memory. Multiple processes attempting to write to the storage system may overwhelm the ability of the redundancy component to service requests for redundancy contexts, resulting in a deadlock or other error state. For example, a new write operation requires allocation of a new redundancy context. If two processes are writing to the storage device at different data rates, the faster process can require allocation of a new redundancy context before the slow process has completed its current write operation. If limitations of the redundancy component prevent allocating a new redundancy context to the faster process before the slower process completes its current operation, other dependencies (e.g., the slower processing waiting for the faster process to complete) can result in deadlock. Conventional redundancy components lack an ability to allow external management of its available redundancy contexts.

Aspects of the present disclosure address the above and other deficiencies by temporarily evicting redundancy contexts from the redundancy component and restoring the redundancy contexts as needed, effectively increasing the number of processes that can be simultaneously serviced without requiring a change to the redundancy component hardware or firmware.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120. In one embodiment, host processes (not illustrated) executing on host system 120 send read and write instructions to memory subsystem 110.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes context manager 113 that can manage eviction and restoration of redundancy contexts from and to redundancy component 123, respectively. In some embodiments, the controller 115 includes at least a portion of the context manager 113. For example, the controller 115 can include a processor 117 (processing device) configured to execute instructions stored in local memory 119 for performing the operations described herein. In some embodiments, the context manager 113 is part of the host system 110, an application, or an operating system.

The context manager 113 can cause the redundancy component 123 to send a context identifier and buffer contents of a redundancy context to memory component(s) 112A-112N and cause the memory component 112A-112N to store the context identifier and buffer contents in a buffer until context manager 113 moves the context identifier into local memory 119. Further details with regards to the operations of the context manager 113 are described below. In one embodiment, memory component(s) 112A-112N include non-volatile memory and a volatile memory working buffer. The processing device can retrieve data written to the volatile memory working buffer.

Figure 2:
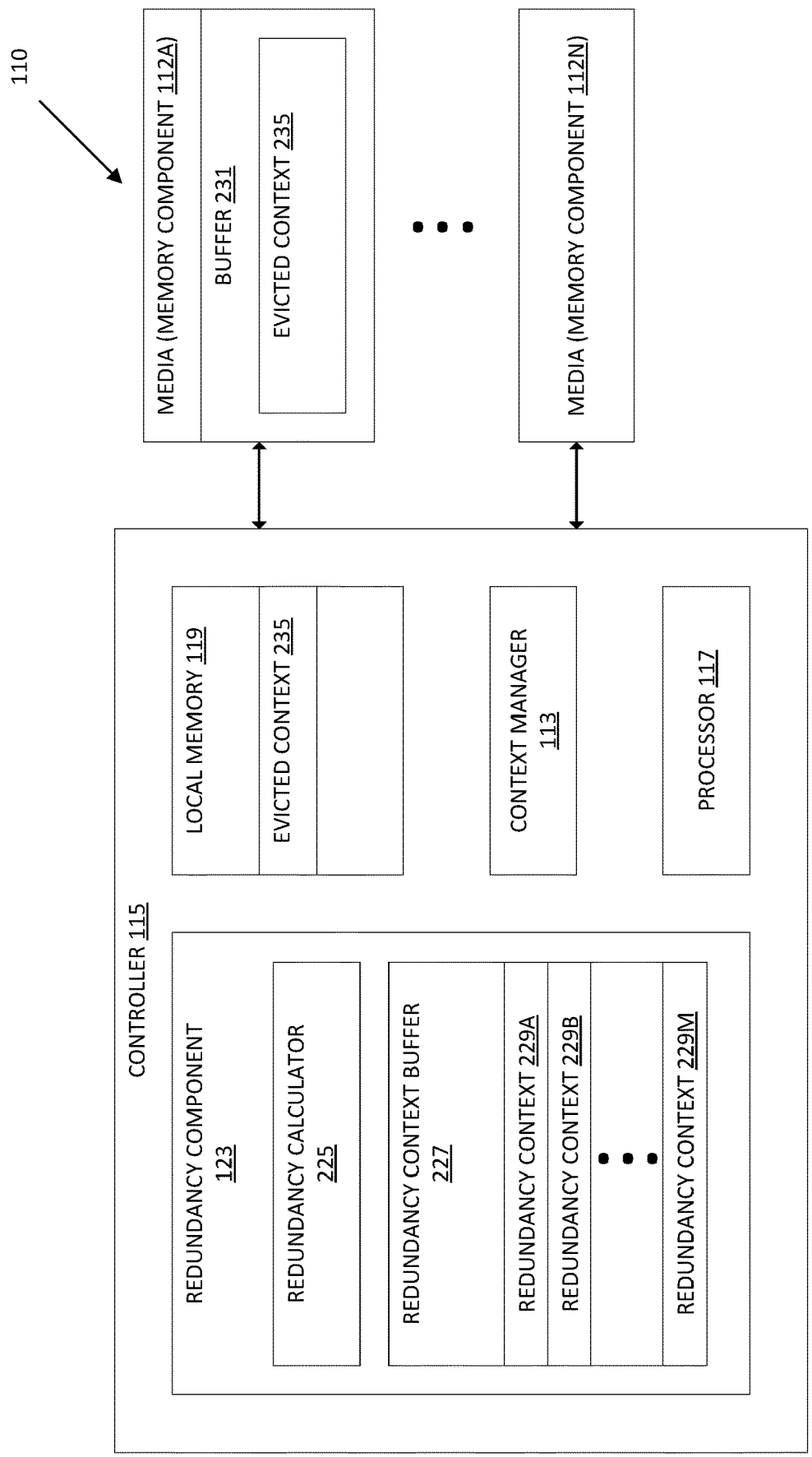
FIG. 2 illustrates a more detailed example of components of the memory subsystem in accordance with some embodiments of the present disclosure.

FIG. 2 illustrates a more detailed memory subsystem in accordance with some embodiments of the present disclosure. Redundancy component 123 includes a redundancy calculator 225 and a redundancy context buffer 227. The redundancy calculator 225 calculates a redundancy value using other data values stored in a redundancy context prior to being written to memory component(s) 112A-112N. In one embodiment, the other data values are received from controller 115 as data to be written and the redundancy component 123 uses redundancy calculator 225 to calculate a redundancy value that the redundancy component 123 will send along with the other data values to memory component(s) 112A-112N for storage. In one embodiment, redundancy calculator 225 uses a logical operation (e.g., a bitwise XOR operation). In one embodiment, the same page (or other division of memory) on each memory die in memory component 112A-112N is XOR'd together to generate the redundancy value. In this embodiment, the memory component 112A-112N stores the XOR value in the same page on another die. The redundancy context buffer 227 includes a limited number of redundancy contexts 229A-229M. Context manager 113 can cause the redundancy component 123 to transmit the metadata and working buffer contents of a redundancy context 229A-229M to memory component 112A-112N as evicted context 235. In one embodiment, less than all of the metadata is sent as evicted context 235. The memory component 112A-112N includes a volatile working buffer 231 that can temporarily store the evicted redundancy context 235. Context manager 113 can cause the memory component to send the evicted context 235 to controller 115 for storage in local memory 119 (e.g., without committing the contents of the evicted context 235 to the media). In one embodiment, the evicted context 235 includes data to be written without a redundancy value. In one embodiment, context manager 113 temporarily stores evicted context 235 in buffer 231 using the existing communication channel between redundancy component 123 and memory component 112A-112N. In one embodiment, when controller 115 requests evicted context 235 to continue processing a write operation, context manager 113 can instruct redundancy component 123 to allocate a new redundancy context in buffer 227 and write the evicted context 235 into the allocated context. In one embodiment, context manager 113 sends instructions to redundancy component 123 and/or memory component(s) 112A-112N to cause these events to occur.

Figure 3:
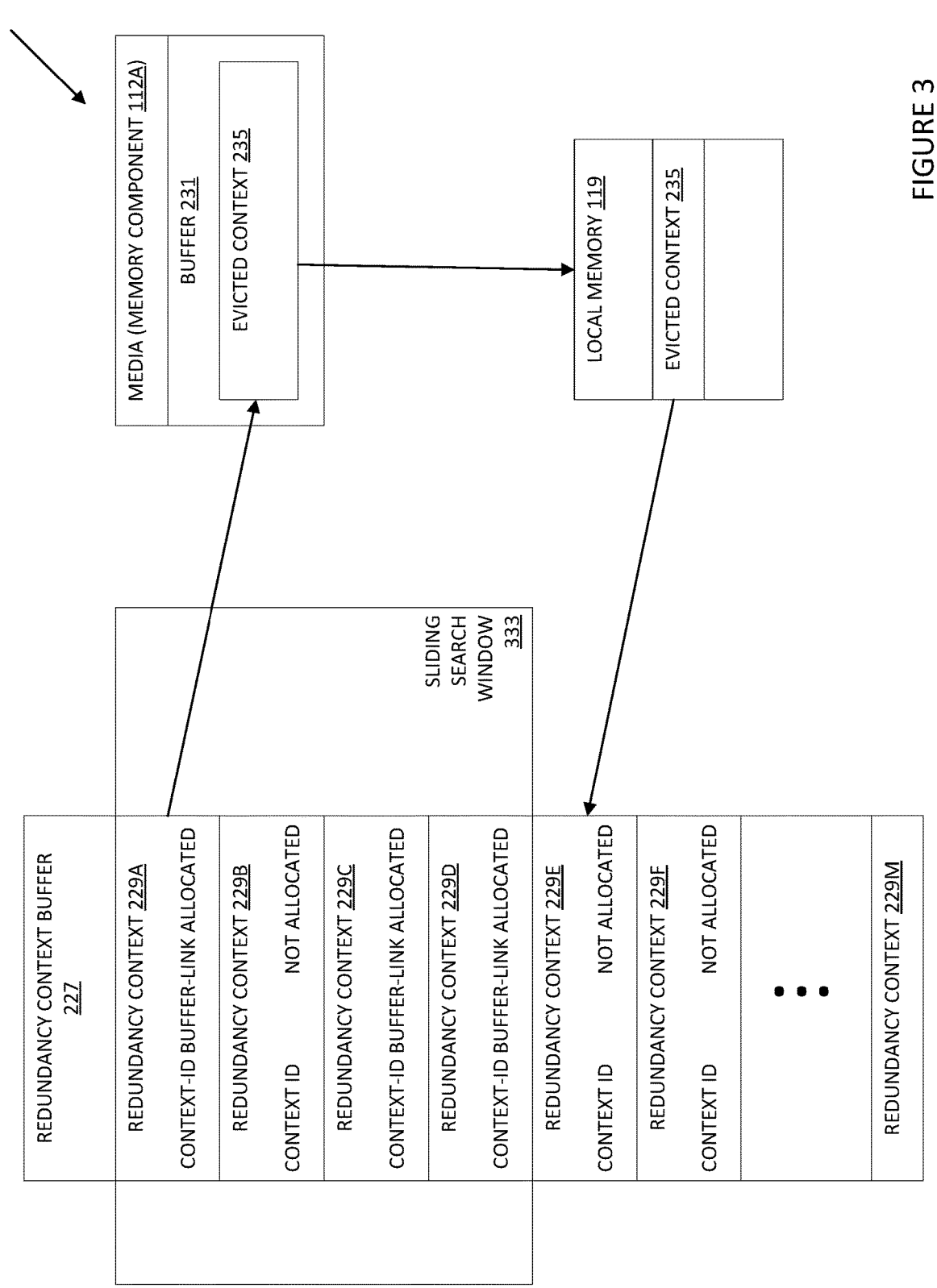
FIG. 3 illustrates a redundancy context buffer in accordance with some embodiments of the present disclosure.

FIG. 3 illustrates a redundancy context buffer in accordance with some embodiments of the present disclosure. In one embodiment, a sliding window 333 is used to access redundancy contexts 229A-229M in buffer 227. In one embodiment, redundancy component 223 implements buffer 227 as a circular list. That is, the entry following 229M is 229A. The sliding window 333 can be a performance optimization in the redundancy component 123 to enhance the rate at which redundancy contexts 229A-229M can be accessed. In one embodiment, the optimization prevents the sliding window 333 from advancing past an allocated redundancy context. Redundancy context 229A is an example of an allocated redundancy context, in other words, a redundancy context currently being used by controller 115 to write data, including error recovery data from the redundancy component 123, to memory component(s) 112A-112N. In one embodiment, the data to be written and error recovery data are stored in a buffer linked to redundancy context 229A. Accordingly, FIG. 3 illustrates a situation in which the available redundancy context 229B cannot be assigned because the sliding window 333 cannot be advanced past allocated redundancy context 229A because 229A is allocated and idle. This results in a deadlock situation and prevents the storage system from performing further write operations. In one embodiment, context 229A is assigned to host process writing at a slower data rate, while redundancy component 223 is attempting to assign context 229B to a host process writing at a faster data rate. The redundancy component 123 is unable to assign context 229B until it can advance the window 333 to context 229B after releasing allocated context 229A. In this embodiment, an external dependency of the slower process on the faster process creates a deadlock situation in which the slower process is waiting for the faster process to complete while the faster process is unable to complete until the slower process completes.

In one embodiment, the processing device avoids the deadlock by evicting context 229A to buffer 231 and then reads it back to local memory 119. When the process to which context 229A was allocated before context 229A was evicted requests the context again, the processing device restores the evicted context 235 to the next available redundancy context (e.g., redundancy context 229D) and provides the process with access to the restored context 229D.

Figure 4:
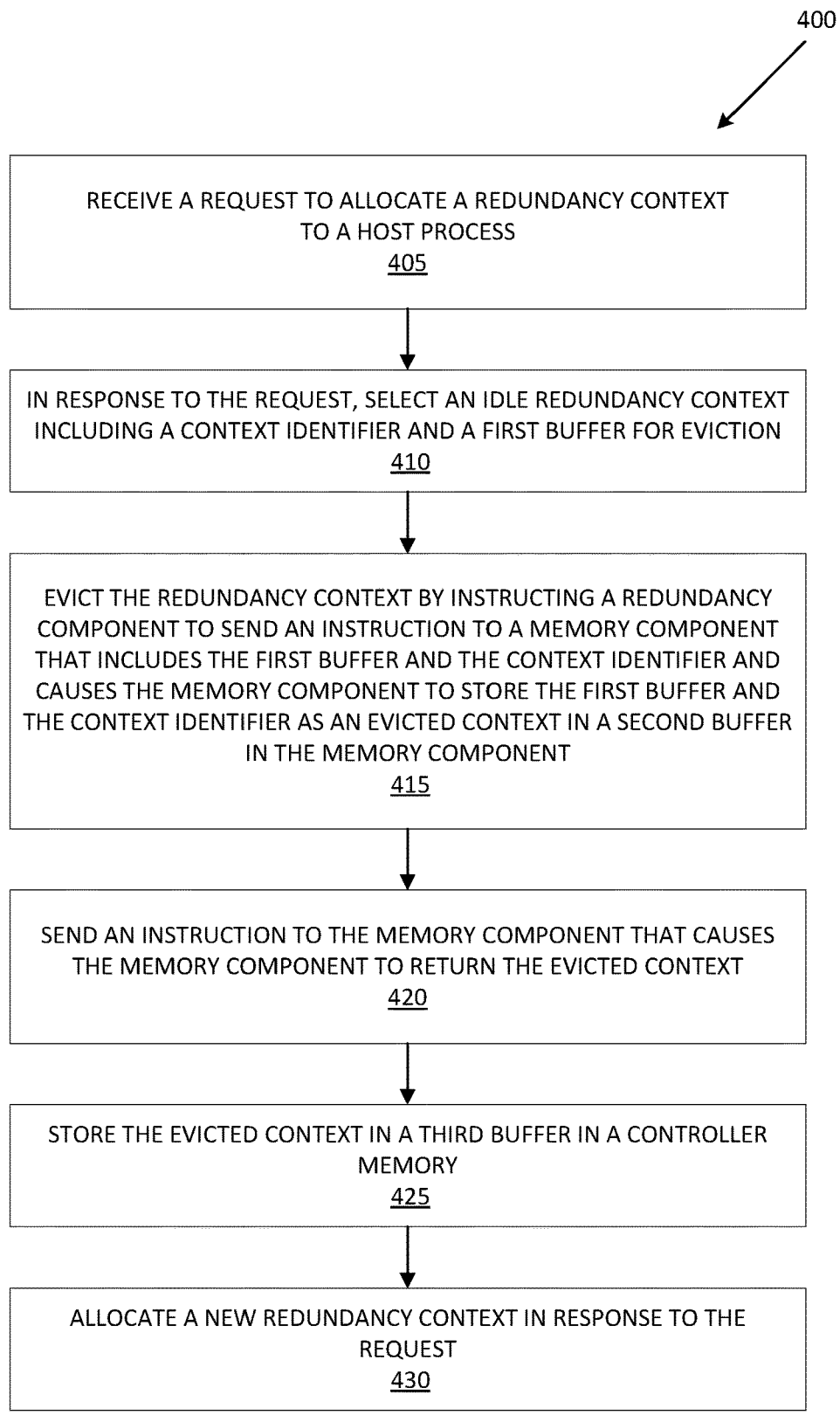
FIG. 4 is a flow diagram of an example method to manage eviction of a redundancy context in accordance with some embodiments of the present disclosure.

FIG. 4 is a flow diagram of an example method 400 to evict redundancy contexts from a redundancy component to a controller memory in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the context manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 405, the processing device receives a request to allocate a redundancy context. The processing device can receive the request as part of a write operation to memory components 112A-112N. In one embodiment, the request is for a clear redundancy context with which to begin a write operation, but in other embodiments the request may specify an existing redundancy context.

At block 410, the processing device selects an idle redundancy context for eviction in response to the request. An idle redundancy context can be a redundancy context that is allocated but not currently being used by its assigned process. In one example, the processing device selects redundancy context 229A for eviction because context 229A is preventing assigning of redundancy context 229B. In one embodiment, the context 229A has a reference to a buffer that contains some of the data required for generating redundancy data. If an unallocated context is available (e.g., when the device powers on), this can be avoided.

At block 415, the processing device evicts the redundancy context by instructing a redundancy component (e.g., redundancy component 123) to send an instruction to a memory component (e.g., memory component 112A) that includes metadata from the redundancy context table entry in the redundancy context buffer and data to be written in a buffer linked to the redundancy context and causes the memory component to store the metadata and linked buffer as an evicted context in a buffer in the memory component. Memory component 112A stores evicted context 235 in buffer 231. In one embodiment, context manager 113 uses a write instruction that routes through the redundancy component 123 to memory component(s) 112A-112N and causes the redundancy component to write out the evicted context to memory component 112A-112N without causing memory component 112A-112N to commit the evicted context to non-volatile memory.

At block 420, the processing device sends an instruction to the memory component that causes the memory component to return the evicted context from the memory component buffer (e.g., buffer 231) to the processing device. In one embodiment, the instruction causes the memory component to transmit the data in the memory component buffer to the processing device. After the memory component transmits the data to the processing device, the memory component can release the portion of the memory component buffer where the data was stored.

At block 425, the processing device stores the evicted context received from the memory component at block 420 in a buffer in controller memory (e.g., local memory 119). In one embodiment, the evicted context remains in the controller memory until requested by the process to which the context was allocated.

At block 430, the processing device allocates a new redundancy context in response to the request. For example, the context selected for eviction at block 410 can be context 229A in Figure C. Now that context 229A is evicted, the window 333 can be advanced to 229B, and processing device can allocate context 229B at block 430 to the process requesting a redundancy context. In one embodiment, the processing device provides a context identifier in response to the request. In this embodiment, controller 115 uses the context identifier to access the newly allocated redundancy context.

Figure 5:
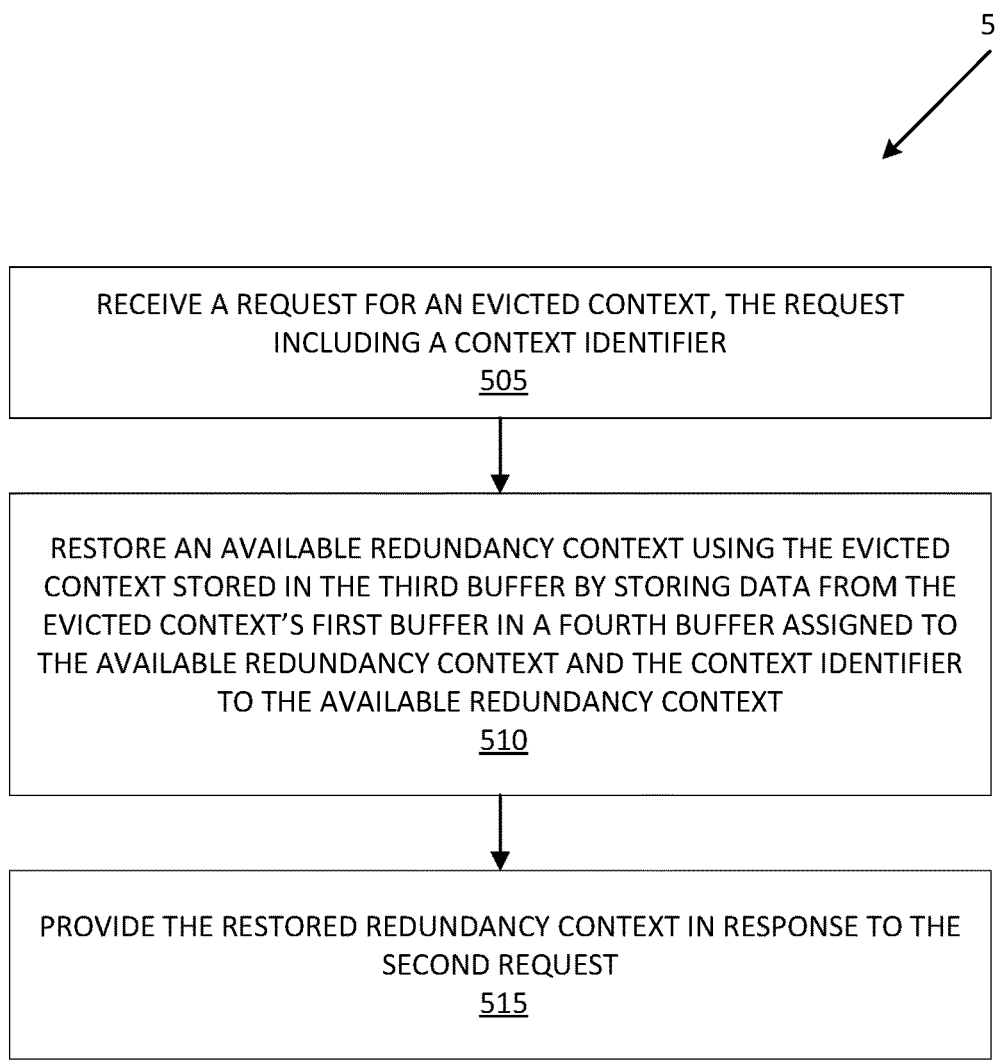
FIG. 5 is a flow diagram of an example method to manage restoration of a redundancy context in accordance with some embodiments of the present disclosure.

FIG. 5 is a flow diagram of an example method to manage restoration of a redundancy context in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the context manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 505, the processing device receives a request (e.g., from a host process saving a file to the storage device) for a redundancy context. In one embodiment, the request includes a context identifier that identifies an allocated redundancy context within the sliding window, which will be returned for use. In another embodiment, the request is for a new redundancy context without data. In another embodiment, the request includes a context identifier that identifies an evicted redundancy context. The method 500 can process requests for evicted redundancy contexts. In one embodiment, the context manager 113 requires processes to request already-assigned redundancy contexts each time the context is used in order to ensure evicted redundancy contexts are restored prior to use.

Continuing the example described above, the request received at block 505 identifies evicted context 235 in local memory 119. In one embodiment, the context manager 113 keeps track of redundancy contexts that have been evicted from the redundancy component. The context manager 113 can store evicted redundancy contexts and corresponding context identifier in local memory 119.

At block 510, the processing device restores a redundancy context. Restoring the context can include allocating an available redundancy context, retrieving the evicted context from controller memory, and storing metadata and linked buffer data from the evicted context in the allocated redundancy context. For example, redundancy context 229E can be allocated as part of restoring evicted context 235 into context 229E.

In one embodiment, the processing device restores the allocated redundancy context by sending an instruction to the redundancy component that includes the evicted context and causes the redundancy component to restore the evicted context to the redundancy context in the redundancy component. For example, redundancy context 229E in redundancy context buffer 227. In one embodiment, the instruction to the redundancy component is a write instruction that includes the data from the evicted context. After clearing the buffer linked to the allocated redundancy context, the write instruction causes the redundancy component to perform the redundancy operation (e.g., a bitwise XOR operation) between the cleared buffer linked to the allocated redundancy context and the buffer data from the evicted context, the result of which is the buffer data of the evicted context, thus restoring the evicted redundancy context.

At block 520, the processing device provides the redundancy context including the restored buffer data in response to the request. In one embodiment, the requester can continue the write operation where the requester left off using the restored redundancy context.

Figure 6:
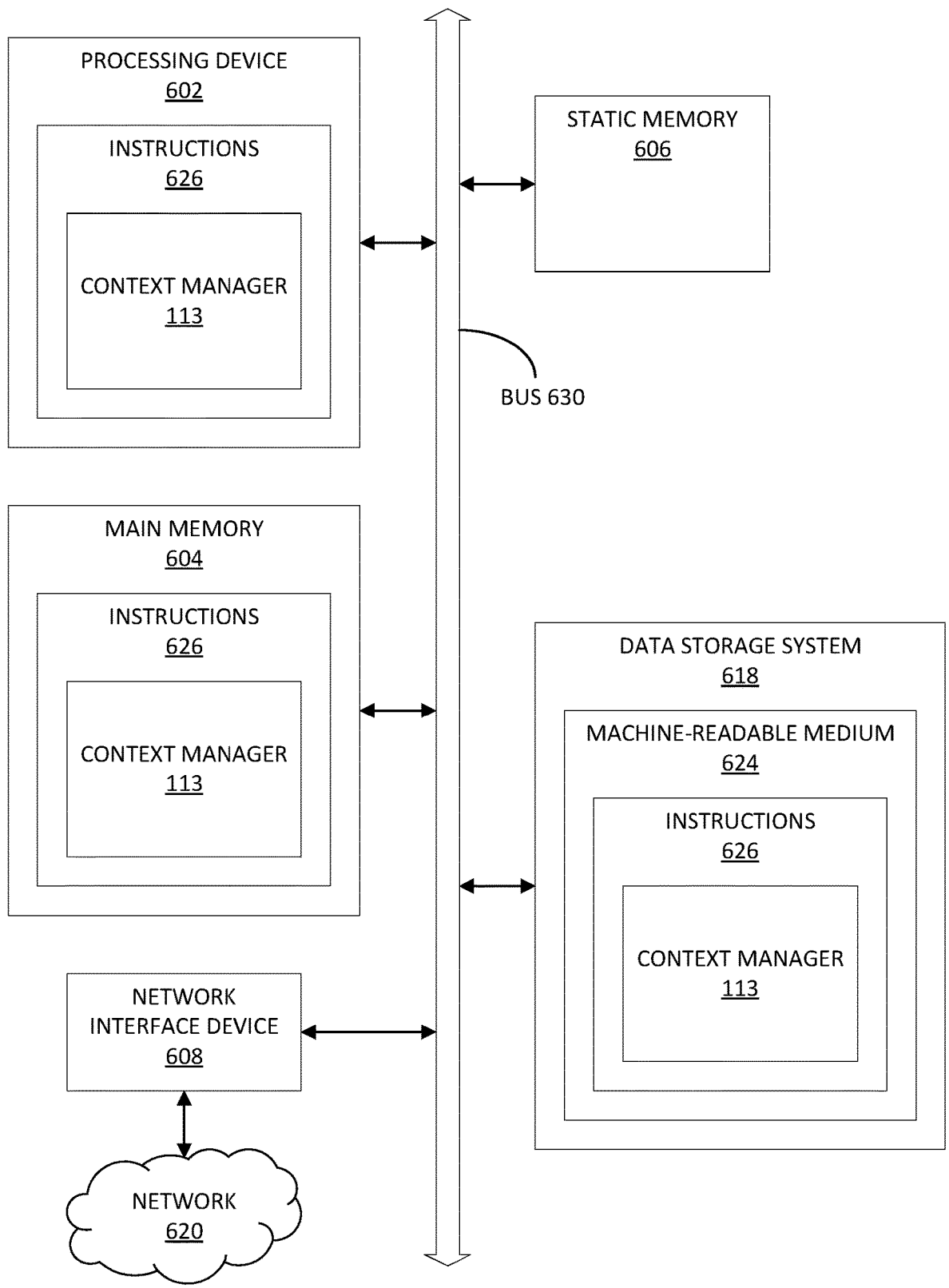
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the context manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a context manager (e.g., the context manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods 400 and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method comprising:
receiving a first request to allocate a portion of a first memory as a redundancy context, wherein the first memory includes a plurality of redundancy contexts temporarily storing data used to calculate redundancy values for the data;
selecting an idle redundancy context for eviction in response to the first request, wherein the idle redundancy context includes a first buffer of data and a context identifier;
evicting contents of the idle redundancy context by sending the first buffer of data and the context identifier to a memory component of a second memory;
retrieving the contents of the evicted context from the memory component of the second memory;
storing the retrieved contents of the evicted context in a second buffer; and
allocating the portion of the first memory as a new redundancy context in response to the first request and the eviction.

2. The method of claim 1, further comprising:
receiving a second request, the second request directed to the contents of the evicted context;
restoring the contents of the evicted context stored in the third second buffer to an available redundancy context; and
providing the restored redundancy context in response to the second request.

3. The method of claim 2, wherein the first request is from a first process writing data at a first rate and wherein the second request is from a second process writing data at a second rate and wherein the first rate is greater than the second rate.

4. The method of the claim 2, wherein restoring the contents of the evicted context comprises:
clearing contents of a third buffer;
storing in the third buffer a result of performing a logical operation on the cleared contents of the third buffer and the data from the contents of the evicted context; and
storing the context identifier from the contents of the evicted context in the available redundancy context.

5. The method of claim 4, wherein the logical operation is a bitwise exclusive-or (XOR) operation.

6. The method of claim 1, wherein the plurality of redundancy contexts is stored in a circular list and wherein each redundancy context is accessed through a sliding window within the circular list.

7. The method of claim 6, wherein selecting the idle redundancy context for eviction includes determining that the redundancy context is preventing the sliding window from advancing to a next available redundancy context.

8. A non-transitory computer-readable storage medium comprising instructions that, when executed by a processing device, cause the processing device to:
receive a first request to allocate a portion of a first memory as a redundancy context, wherein the first memory includes a plurality of redundancy contexts temporarily storing data used to calculate redundancy values for the data;
select an idle redundancy context for eviction in response to the first request, wherein the idle redundancy context includes a first buffer of data and a context identifier;
evict contents of the idle redundancy context by sending the first buffer of data and the context identifier to a memory component of a second memory;
retrieve the contents of the evicted context from the memory component of the second memory;
store the retrieved contents of the evicted context in a second buffer; and
allocate the portion of the first memory as a new redundancy context in response to the first request and the eviction.

9. The storage medium of claim 8, the instructions further causing the processing device to:
receive a second request, the second request directed to the contents of the evicted context;
restore the contents of the evicted context stored in the second buffer to an available redundancy context; and
provide the restored redundancy context in response to the second request.

10. The storage medium of claim 9, wherein the first request is from a first process writing data at a first rate and wherein the second request is from a second process writing data at a second rate and wherein the first rate is greater than the second rate.

11. The storage medium of the claim 9, wherein instructions causing the processing device to restore the available redundancy context further includes instructions causing the processing device to:
clear contents of a third buffer;
store in the third buffer a result of performing a logical operation on the cleared contents of the third buffer and the data from the contents of the evicted context; and
store the context identifier from the contents of the evicted context in the available redundancy context.

12. The storage medium of claim 11, wherein the logical operation is a bitwise exclusive-or (XOR) operation.

13. The storage medium of claim 12, wherein the plurality of redundancy contexts is stored in a circular list and wherein each redundancy context is accessed through a sliding window within the circular list.

14. The storage medium of claim 13, wherein selecting the redundancy context for eviction includes determining that the redundancy context is preventing the sliding window from advancing to a next available redundancy context.

15. A system comprising:
a memory component; and
a processing device, coupled to the memory component, configured to:
receive a first request to allocate a portion of a first memory as a redundancy context, wherein the first memory includes a plurality of redundancy contexts temporarily storing data used to calculate redundancy values for the data;
select an idle redundancy context for eviction in response to the first request, wherein the idle redundancy context includes a first buffer of data and a context identifier;
evict contents of the idle redundancy context by sending the first buffer of data and the context identifier to a memory component of a second memory;
retrieve the contents of the evicted context from the memory component of the second memory;
store the retrieved contents of the evicted context in a second buffer; and
allocate the portion of the first memory as a new redundancy context in response to the first request and the eviction, receive a second request, the second request directed to the contents of the evicted context;

restore the contents of the evicted context stored in the third second buffer to an available redundancy context; and provide the restored redundancy context in response to the second request.

16. The system of claim 15, wherein the first request is from a first process writing data at a first rate and wherein the second request is from a second process writing data at a second rate and wherein the first rate is greater than the second rate.

17. The system of the claim 15, wherein restoring the available redundancy context further configures the processing device to:

clear contents of a third buffer;

store in the third buffer a result of performing a logical operation on the cleared contents of the third buffer and the data from the contents of the evicted context; and store the context identifier from the contents of the evicted context in the available redundancy context.

18. The system of claim 17, wherein the logical operation is a bitwise exclusive-or (XOR) operation.

19. The system of claim 18, wherein the plurality of redundancy contexts is stored in a circular list and wherein each redundancy context is accessed through a sliding window within the circular list.

20. The system of claim 19, wherein selecting the redundancy context for eviction includes determining that the redundancy context is preventing the sliding window from advancing to a next available redundancy context.

* * * * *

UNITED STATES PATENT AND TRADEMARK OFFICE
CERTIFICATE OF CORRECTION

PATENT NO. : 10,872,039 B2
APPLICATION NO. : 16/208499
DATED : December 22, 2020
INVENTOR(S) : James P. Crowley et al.

Page 1 of 1

It is certified that error appears in the above-identified patent and that said Letters Patent is hereby corrected as shown below:

In the Claims

In Column 11, Line 30, delete "third"

In Column 13, Line 4, delete "third"

Signed and Sealed this
Seventh Day of December, 2021

Drew Hirshfeld
*Performing the Functions and Duties of the
Under Secretary of Commerce for Intellectual Property and
Director of the United States Patent and Trademark Office*